United States Patent [19]

Marcellis et al.

[11] 4,391,645

[45] Jul. 5, 1983

[54] ADDITIVES FOR CEMENTITIOUS MATERIALS

[75] Inventors: Alphonso W. Marcellis, Boonton; Grannis S. Johnson, Plainfield, both of N.J.

[73] Assignee: Diamond Shamrock Corporation, Dallas, Tex.

[21] Appl. No.: 367,263

[22] Filed: Apr. 12, 1982

[51] Int. Cl.$^3$ .............................................. C04B 7/35
[52] U.S. Cl. ...................................... 106/90; 106/314
[58] Field of Search .................................... 106/90, 314

[56] References Cited

U.S. PATENT DOCUMENTS

| | | | |
|---|---|---|---|
| 188,679 | 3/1877 | Schaffer | 106/90 |
| 1,805,104 | 5/1931 | Reed-Lewis | 106/90 |
| 1,840,710 | 1/1932 | Goddard | 106/90 |
| 2,141,569 | 12/1938 | Tucker | 106/90 |
| 2,360,518 | 10/1944 | Scripture | 106/314 |
| 2,860,060 | 11/1958 | Benedict et al. | 106/314 |
| 3,537,869 | 11/1970 | Proell | 106/95 |
| 3,656,985 | 4/1972 | Bonnel et al. | 106/90 |
| 3,677,780 | 7/1972 | Nishi et al. | 106/90 |

FOREIGN PATENT DOCUMENTS 354502  9/1931  United Kingdom ................. 106/90

OTHER PUBLICATIONS

CA 71 104857s.
CA 88 125395f.
CA 88 138827y.
CA 92 151993b.
CA 71 84287a.
CA 58 9946a.
CA 75 39979z.

*Primary Examiner*—James Poer
*Attorney, Agent, or Firm*—Neal T. Levin

[57] ABSTRACT

Superplasticizers with improved water reducing properties for cement, cement slurries, mortar, grout and concrete are formed from synergistic mixtures of (1) aromatic sulfonic acid formaldehyde condensates, such as the sodium salt of naphthalene sulfonic acid formaldehyde condensate and (2) hydroxy aromatic compounds such as pyrogallol and gallic acid. Addition of these mixtures to the same cementitious materials also results in improved compressive strength.

17 Claims, No Drawings

ADDITIVES FOR CEMENTITIOUS MATERIALS

BACKGROUND OF THE INVENTION

1. Field of the Invention

This invention relates to additives which improve the compressive strength and workability of cementitious composition such as cement, cement slurries, mortar, grout and concrete.

2. Description of the Prior Art

Concrete is a hard, strong building material made by mixing cement, sand, gravel and water. Water in the mixture causes the cement to set and bind the entire mixture in a hard mass. It is well known in concrete technology that the strength—usually the compressive strength as measured by the ASTM test C39-72—is a reliable criterion of general quality. For this reason, the whole technology of concrete is developed around obtaining a significant and practical strength with a minimum of cost, and a maximum of convenience in use. Despite extensive research, most of the concrete presently being used are simple mixtures of sand and coarse stone containing a minor proportion of portland cement with sufficient water being added to produce a mixture fluid enough to place in forms.

It is well known in the art that reducing water in concrete increases the compressive strength and other properties as well. Considerable research has been directed to discovering mixtures of different particle sizes of sand and stone which will give fluid concrete having minimum water content. Also, various organic and inorganic additives have been found which permit reduction in the water content of concrete. One such additive, the sodium salt of naphthalene sulfonic acid formaldehyde condensate is used commercially for this purpose. This additive also increases the strength of hardened concrete. See U.S. Pat. No. 2,141,569—Tucker—Dec. 27, 1938.

Further, U.S. Pat. No. 3,537,869—Proell—Nov. 3, 1970 describes use of additives containing sulfonated condensation products of formaldehyde and naphthalene or salts thereof in combination with lecithin, partial fatty acid esters of polyols, their ethoxylates, sulfates, etc., in concrete mixes to increase compressive strength of the hardened concrete.

Additionally, use of hydroxy aromatic materials in cement and concrete is shown below.

CA 71 104857s discloses effect of pyrocatechol, pyrogallol and condensed and hydrolyzed tannins as accelerators for cement with various results upon acceleration and mechanical strength.

CA 88 125395f discloses effect of gallic acid plus triethanolamine in cement production upon moisture content of the clinker.

CA 88 138827y discloses effect of monocarboxylic aromatic hydroxy acids in retarding hardening of slurries of portland cement.

CA 92 151993b describes effect of tannic acid on the setting of portland cement.

CA 71 84287a discloses effect of chestnut tannin as a retarder in cement.

CA 58 9946a discloses effect of resorcinol and hydroquinone in the rate of hardening of cement.

British Pat. No. 354,502 describes addition of tannin and tannic acid to cement clinker.

CA 75 39979z discloses effect of salicylic acid on workability and setting times for mortar and concrete.

U.S. Pat. No. 188,679—Schaffer—Mar. 20, 1877 discloses use of salicylic acid in the manufacture of artificial stone from portland cement, sand and crushed stone.

SUMMARY OF THE INVENTION

Mixtures or blends of (1) one or more of particular hydroxy aromatic compounds and (2) one or more salts of aromatic sulfonic acid formaldehyde condensates added to concrete mixes and other cementitious materials act synergistically to reduce the water required for good workability and result in cementitious compositions such as cement, cement slurries, mortar, grout and concrete of increased compressive strength. The blends may be added at any point during the preparation of the cementitious material and may be added in liquid or solid form depending on when it is introduced. The blends are added in effective amounts to reduce the water content and to bring about increased compressive strength of the hardened product. For example, from about 0.05% to about 3% by weight of the blends, based on the weight of the cement component, may be used in concrete mixes. The percent by weight of the salts of aromatic sulfonic acid formaldehyde condensates in the blends can vary from about 90% to about 30% while the percent by weight of the hydroxy aromatic compound can vary from about 10% to about 70%.

DESCRIPTION OF THE PREFERRED EMBODIMENTS

It was unexpectedly found that when these hydroxy aromatic compounds were blended with salts of aromatic sulfonic acid formaldehyde condensates and the mixture added to mortar or concrete, compressive strengths higher than the commercial additive alone or the hydroxy aromatic compound alone resulted. Furthermore, the mixtures were better water reducers than the commercial superplasticizer alone or the hydroxy aromatic compounds alone.

Hydroxy Aromatic Compounds

The hydroxy aromatic compounds are one or a mixture of compounds having the following structures:

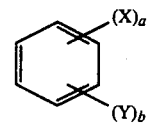

where
X is —OH or —O Cation, a is 1, 2 or 3,
Y is

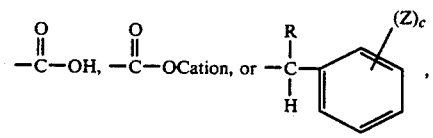

b is 0, 1, 2 or 3 with the proviso that in the instance where a is 1, b is 1, R is —H or lower alkyl,
Z is —OH, —O Cation,

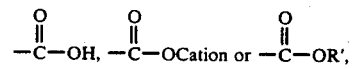

R' is —H or lower alkyl and c is 0, 1, 2 or 3 and

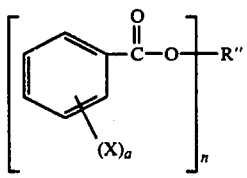

where
X is —OH or —O Cation, a is 1, 2 or 3, n is a whole number of 1 to 6 and

R" is —CH$_3$; —CH$_2$CH$_3$; —CH$_2$CH$_2$CH$_3$; —CH$_2$CH$_2$—;

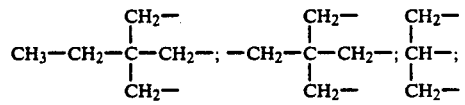

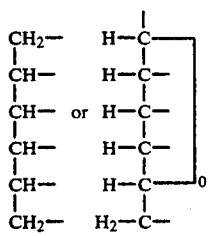

with the proviso that when n does not completely satisfy all of the bonds of R", the remaining bonds are satisfied with —OH.

Examples of —O Cation are mono- di- and trivalent cations such as —ONa, —OK, —OLi, —OBa$_½$—OCa$_½$, —OMg$_½$, —OAl$_⅓$; primary, secondary and tertiary amines including ONH$_4$, —OHNR$_3$''' where R''' is H or straight or branched chain lower alkyl such as methyl, ethyl, propyl, isopropyl, butyl, amyl and R''' can be the same or different; and OH alkanolamine such as —OH ethanolamine, —OH propanolamine, —OH diethanolamine, —OH triethanolamine all of which form basic salts.

Examples of

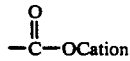

are alkali metal, alkaline earth, ammonium, amine and alkanolamine carboxylates where the cation can be the same as the cation in —O Cation above which form basic salts.

R and R' can be H, or lower alkyl such as methyl, ethyl or propyl.

Examples of compounds falling within the Formula I structure are: quinol (hydroquinone), catechol (pyrocatechol), resorcinol, pyrogallol, phloroglucinol, gallic acid and its salts such as sodium, potassium, aluminum, magnesium, ammonium and amine gallate. Also useful are amine salts such as the lower alkyl primary and secondary amines salts such as methylamine, dimethylamine and lower primary and secondary alkanolamine salts such as ethanolamine and diethanolamine salts of gallic acid.

Other examples are salicylic acid and salts of salicylic acid such as sodium, potassium and ammonium salicylate; 2,3-dihydroxybenzoic acid and its alkali metal salts such as the sodium, potassium and lithium salts and its alkaline earth metal salts such as the magnesium, calcium and barium salts. The ammonium salt is also effective.

Examples of compounds falling within the Formula II structure are esters of salicylic acid such as the lower esters, e.g., methyl, ethyl and propyl salicylate, esters of 2,3-dihydroxybenzoic acid such as the methyl, ethyl and propyl esters of 2,3-dihydroxybenzoic acid, the mono, di, tri and higher esters of gallic acid such as methyl, ethyl, and propyl gallate, gallotannin (tannic acid), also referred to and pentadigalloylglucose, tannin containing natural products such as Quebracho and wattle extracts the mono- and digallates of ethylene glycol, the mono, di and tri gallates of trimethylolpropane and glycerol and the mono, di, tri and tetra gallates of pentaerythritol.

Aromatic Sulfonic Acid Formaldehyde Condensate

The commercial superplasticizer, the sodium salt of naphthalene sulfonic acid formaldehyde condensate was found to be the preferred aromatic sulfonic acid formaldehyde condensate effective in the synergistic mixture. Although the preferred form of these condensates is their sodium salt, they can be used in the form of other salts such as the calcium, potassium, zinc, aluminum, magnesium, maganese, ferrous, ferric and ammonium salts. Amine salts can be used such as the methylamine, dimethylamine, ethanolamine and diethanolamine salts. These condensates may be prepared by reacting a mixture of naphthalene or other aromatic such as benzene, toluene, xylene, benzoic acid, phthalic acid and phenol with formaldehyde and sulfuric acid. Useful processes are described in U.S. Pat. No. 2,141,569—Tucker et al—Dec. 27, 1938; U.S. Pat. No. 3,193,575—Nebel et al—July 6, 1965 and U.S. Pat. No. 3,277,162—Johnson—Oct. 4, 1966. Other aromatic sulfonic acid formaldehyde condensates which can be used herein in their salt forms are the benzene, toluene, xylene, benzoic acid, phthalic acid and phenol sulfonic acid formaldehyde condensates and copolymers of these with naphthalene.

Naphthalene sulfonic acid formaldehyde condensate is a mixture of condensation products of naphthalenesulfonic acid and formaldehyde. It can be chromatographed by size exclusion chromatography through a column containing pore sizes which selectively separate molecular volumes according to size. The solvent chosen for the acid in chromatography should minimize solute-packing interaction and solute-solute interaction. The chromatogram gives a true molecular volume profile when the eluents are displayed on a detector-strip chart recorder display. The chromatogram for a sample of the sulfonic acid used in the examples is the same as that for the sodium naphthaleneformaldehyde sulfonate in U.S. Pat. No. 3,954,491—Adrian et al—May 4, 1976, and the two anionic materials are identical. That is, the anionic materials from the acid have the same profile as the anionic materials from the sodium naphthaleneformaldehyde sulfonate having lowest elution volumes of from above 61 to about 70% of the total elution volume and equivalent elution volumes of from about 61 to about 70% of the total elution volume. The teachings in U.S. Pat. No. 3,954,491 relating to chromatography are incorporated by reference herein. This chromatographic method was described by Dr. Harold Edelstein in a paper entitled, "Aqueous Gel Permeation Chromatograph of Some Naphthalene Sulfonic Acid Formaldehyde Condensates" presented at the Mini Symposium of the North Jersey Chromatography Group Subsection of the A.C.S. on Mar. 6, 1978 at Hoffman La Roche Auditorium, Clifton N.J.

The ratio of hydroxy aromatic compound and superplasticizers varies depending on the combination used. But in general, the superplasticizer, i.e., the sodium salt and other salts of aromatic sulfonic acid formaldehyde condensate exhibit synergism with the hydroxy aromatic compound in the range of about 30% to about 90% by weight with about 10 to about 70% by weight of hydroxy aromatic compound. It has been found that the ratio can be adjusted to give the optimum workability and high compressive strength.

Cementitious Materials

The cementitious materials are cement slurries, mortar, grout and concrete, all of which are well-known in the art. The cements used in the preparation of the concrete mixes include Type I, II and III cements and Type H cement which is used in cement slurries for oil well cementing applications. The properties of the cements are well known and are described in the Portland Cement Association Engineering Bulletin entitled "Design and Control of Concrete Mixtures," Twelfth Edition, 1979, and "Kirk Othmer Encyclopedia of Chemical Technology," Second Edition (Interscience Publishers, N.Y., N.Y. 1967), Volume 4, pages 690–692. The teachings as to the properties of these cements are disclosed in these publications and are incorporated by reference herein.

These cements may be used to prepare concrete mixes containing 100 parts by weight of cement, from about 140 to about 260 parts by weight of sand, from about 100 to about 200 parts by weight of gravel and from about 35 to about 60 parts by weight of water, with the preferred concrete mixes containing 100 parts by weight of cement, from about 160 to about 230 parts by weight of sand, from about 140 to about 180 parts by weight of gravel and from about 38 to about 50 parts by weight of water. After preparation, these concrete mixes are then allowed to harden to obtain hardened concretes.

For a fuller understanding of this invention, reference may be made to the following examples. These examples are given merely to illustrate the invention and are not to be construed in a limiting sense.

Examples I through VIII describe the preparation and evaluation of mixtures of sodium salt of naphthalene sulfonic acid formaldehyde condensate (for convenience referred to as "condensate") and various hydroxy aromatic compounds:

EXAMPLE I

A blend of 83% by weight of sodium salt of naphthalene sulfonic acid formaldehyde condensate and 17% by weight of pyrogallol was prepared by mixing 100 grams of an aqueous solution of the condensate (40% by weight solids) with 28.5 grams of a 28% by weight aqueous solution of pyrogallol. The mixture was stirred at ambient temperature to form a clear solution containing 37% by weight solids.

EXAMPLE II

In a similar manner as Example I, a blend of 17% by weight sodium gallate and 83% by weight of sodium salt of naphthalene sulfonic acid formaldehyde condensate was prepared by mixing 100 grams of the condensate (40% by weight solids) and 44 grams of an 18% by weight solution of sodium gallate. The clear solution contained 33% by weight solids.

EXAMPLE III

As in Example I, 100 grams of condensate (40% by weight solids) and 40 grams of 20% by weight aqueous solution of tannic acid were stirred at ambient temperature until a clear solution formed. The solution (34.3% by weight solids) contained 17% by weight tannic acid and 83% by weight of condensate.

EXAMPLE IV A

A blend of 17% by weight Quebracho powder, a bark extract high in tannins, and 83% by weight of condensate was made by mixing 10 grams of a 40% by weight aqueous solution of Quebracho and 50 grams of a 40% by weight aqueous solution of condensate until clear.

EXAMPLE IV B

A blend of 25% by weight of Quebracho and 75% by weight of condensate was prepared by mixing 100 grams of 40% by weight Quebracho solution and 300 grams of condensate (40% by weight solution).

EXAMPLE IV C

A blend of 50% by weight of Quebracho and 50% by weight of condensate was prepared by mixing 200 grams of a 40% by weight solution of condensate and 200 grams of a 40% by weight solution of Quebracho.

EXAMPLE V A

A blend of 17% by weight of catechol and 83% by weight of condensate were prepared by dissolving 8 grams of catechol in 100 grams of condensate (40% by weight solids).

EXAMPLE V B

A blend of 17% by weight of resorcinol and 83% by weight of condensate were prepared by dissolving 8 grams of resorcinol in 100 grams of condensate (40% by weight solids).

EXAMPLE VI

A blend of 17% by weight of sodium salicylate and 83% by weight of condensate were prepared by mixing 100 grams of 40% by weight of condensate, 8 grams of salicylic acid and 19 grams of dilute sodium hydroxide (1.3 grams in 100 grams water). The mixture contained 38.8% by weight solids and had a pH of 8.5.

The following example describes the evaluation of the mixtures prepared above in concrete and demonstrate the synergistic effect regarding improvement in water reduction and increased compressive strength.

EXAMPLE VII

This example describes the evaluation of 0.5% by weight of solids of the various blends based on the weight of the cement used in the mix; 0.5% by weight of solids of condensate; 0.5% by weight of solids of the hydroxy aromatic material and a control mix. The blends were prepared as described in Examples I—VI. Table I shows the mix proportions used in the mixes in this example. The mix is a mortar type mix found suitable for laboratory testing.

TABLE I

| Proportions Used in Mortar Type Mix | |
|---|---|
| Component | Lab Mix Weight (grams) |
| Cement - Type I | 400 |
| Sand (Fineness Modulus 7.9) | 1200 |
| Water | As indicated in Table II |

In these evaluations, water was adjusted to give constant slumps of 1¾ inches to 1⅞ inches. In this manner water reduction was more readily compared.

In the concrete batching procedure, a Hobart mixer was used. The sand was added to the mixer and water containing the additive and the cement were added simultaneously to the sand. The cement was mixed for 3 minutes, allowed to stand for 3 minutes and mixed for an additional 2 minutes. Batching was done at 70°–75° F. and a 50% relative humidity.

Slump was measured immediately after mixing using a pipe (4¼" Ht. × 3" I.D.) set in a flat plate. The pipe was filled incrementally ⅓ at a time and consolidated by rodding after each increment was added. The top was struck flat and the base cleared of extraneous cement. The pipe was then raised and the slump measured in inches as the difference between the top of the pipe and the top of the cement. The air content in the fresh cement was checked using a Chaser air indicator. Specimens used for compressive strength testing were 3 × 6 inches (75 × 150 mm) cylinders consolidated by rodding and cured at 70°–75° F., and 100% relative humidity. Data was collected after 7 days based on an average of values obtained from three cylinders following ASTM standard C39-72.

Results of these evaluations are shown in Table II entitled, "Slump and Compressive Strength Tests."

TABLE II

| | Slump Reduction and Compressive Strength Tests | | | | |
|---|---|---|---|---|---|
| No. | Description | Water Used (gms) | % Water Reduct. | Slump (in.) | % Air | 7-Day Compressive Strength (psi) |
| | | | | | | Avg. of 2 |
| 1. | Blank (No Additive) | 204 | — | 1¾ | 3+ | 2964 |
| 2. | Condensate | 174 | 15 | 1¾ | 4+ | 3081 |
| 3. | 83% by wt. condensate 17% by wt. Pyrogallol | 169 | 17 | 1¾ | 3.5+ | 3574 |
| 4. | 83% by wt. condensate 17% Sodium Gallate | 166 | 19 | 1¾ | 3.5+ | 3775 |
| 5. | 83% condensate 17% Tannic Acid | 158 | 23 | 1¾ | 4+ | 3496 |
| 6. | 83% condensate 17% Quebracho | 168 | 18 | 1¾ | 4+ | 3510 |
| 7. | 83% condensate 17% Catechol | 166 | 19 | 1⅞ | 4 | 3524 |
| 8. | 83% condensate 17% Resorcinol | 163 | 20 | 1¾ | — | 3553 |
| 9. | 83% condensate 17% Sodium Salicylate | 162 | 21 | 1¾ | — | 3763 |
| 10. | Pyrogallol | 173 | 15 | 1¾ | 3 | Very Fragile- Essentially no strength. |
| 11. | Sodium Gallate | 178 | 13 | 1¾ | 2.78 | 1388 |
| 12. | Tannic Acid | 188 | 12 | 1¾ | 4 | 2617 |
| 13. | Quebracho | 179 | 12 | 1¾ | 4 | 3378 |
| 14. | Catechol | 186 | 9 | 1¾ | 4 | 1663 |
| 15. | Resorcinol | 180 | 12 | 1¾ | 4+ | 3256 |
| 16. | Sodium Salicylate | 175 | 14 | 1¾ | 4¼ | 3246 |

The results in Table II show a definite synergism regarding both increased water reduction and compressive strength. Specifically, the water reduction of the condensate compared to the blank (no additive) is 15% and the 7-day compressive strength is 3081 psi. The water reduction of a 5 to 1 blend of condensate and tannic acid is 23%, a 53% reduction compared to condensate alone and 92% reduction compared to tannic acid alone. The compressive strength of the blend was 3496 psi., a 13% increase compared to the condensate alone and a 34% increase over tannic acid alone. The synergistic effect is apparent in all of the other blends shown in Table II, to a greater or lesser degree than the tannic acid condensate blend.

EXAMPLE VIII

This example describes the evaluation of slump and compressive strength of 0.5% based on the weight of cement of various blends of Quebracho and condensate and 0.5% by weight of condensate based on the weight of cement in the concrete mix and a control concrete mix. Table III entitled, "Standard Mix Proportion Non-Air Entrained Concrete" shows the standard mix proportion used in the concrete mixes in this Example. This table is from the Portland Cement Association Engineering Bulletin entitled, "Design and Control of Concrete Mixtures," Eleventh Edition, July 1968. The standard mix proportion given in Table III was used as the control giving a reasonable workability for the tests. In the evaluation of the additives, water in the standard mix was reduced 17% to achieve a workable concrete mix. The cement used was Type I. Sand and ⅜ inches (10 mm) gravel meeting ASTM standard C33-74a. were used. Except for a minor modification, the concrete batching procedure using a 2½ cu. ft. (0.07 m³) tilting drum mixer followed ASTM standard C192-69. This variation, which results in better reproducibility in the properties of wet concrete, involves adding the additive with the last volume of water rather than initially with the gravel.

Slump was measured according to ASTM standard C143-74. The air content in the fresh concrete was periodically checked by the pressure method (ASTM standard C231-75); however, for convenience, the Chaser air indicator was used more frequently.

Specimens used for compressive strength testing were 3×6 inches (75×150 mm) cylinders, consolidated by rodding and cured at 70°–75° F. and at 100% relative humidity. Data were collected at 1, 7 and 28 days based on the average of values obtained for three cylinders following ASTM standard C39-72.

Results of this evaluation are shown in Table IV entitled, "Compressive Strength Tests at 17% Water Reduction".

TABLE III

Standard Mix Proportion
Non-Air Entrained Concrete
Water/Cement Ratio = 0.5
Coarse Aggregate = ⅜ inch (10mm)
Fine Aggregate = Fineness Modulus 2.9

| Component | Weight lb. | kg |
|---|---|---|
| Cement | 770 | 349.3 |
| Water | 385 | 174.6 |
| Sand | 1510 | 663.9 |
| Gravel | 1150 | 521.6 |

TABLE IV

Compressive Strength Tests at 17% Water Reduction

| Additive | % Air Content | Slump (in.) | Compressive Strength after (psi) 1-Day | 7-Days | 28-Days |
|---|---|---|---|---|---|
| Control (No Additive) | 4½ | 5.75 | 1928 | 3500 | 4464 |
| Condensate | 4 | 7.5 | 3107 | 4310 | 5821 |
| Quebracho/condensate 1:1 | 4½ | 4.5 | 3202 | 4666 | 6536 |
| Quebracho/condensate 1:3 | 3 | 8.0 | 3238 | 4809 | 6405 |
| Quebracho/condensate 1:5 | 4 | 8.25 | 3274 | 4821 | 6238 |

Table IV gives comparative data on water reduction and compressive strength and demonstrates the superiority of certain of the blends to the condensate alone. The "Control" in Table IV was a concrete mix that contained no additive and had a water to cement ratio of 0.5 while the condensate and the blends had a water/cement ratio of 0.43, i.e., a 17% water reduction over the control. The 1:5 blend of Quebracho to condensate gave a slump of 8.25 inches compared to 7.5 inches for condensate alone indicating improved water reduction. The compressive strength of this blend was 5% higher than the condensate alone after 1-day, about 12% higher after 7-days and 7% higher than the condensate alone after 28-days. The 1:3 blend of Quebracho to condensate similarly gave improved water reduction as indicated by a slump of 8.0 inches compared to 7.5 inches for the condensate alone. The compressive strength of this blend was also greater than the condensate alone after 1-day, 7-days and 28-days at which time it was 10% greater. The 1:1 blend of Quebracho and condensate was not as good in water reduction as the condensate alone as indicated by the slump of 4½ inches compared to 7.5 inches for the condensate alone. The compressive strength, however, was greater at 1, 7 and 28-days when it was 12% greater.

Air entrainment, expressed as % air for all the blends, was in the proper range for good workability.

While the invention has been described with reference to certain specific embodiments thereof, it is understood that is not to be so limited since alterations and changes may be made therein which are within the full intended scope of the appended claims.

What is claimed is:

1. An additive for cementitious materials comprising:
   (a) at least one salt of aromatic sulfonic acid formaldehyde condensate, and
   (b) at least one hydroxy aromatic compound selected from:

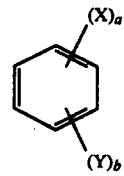

where
X is —OH or —O Cation, a is 1, 2 or 3,
Y is

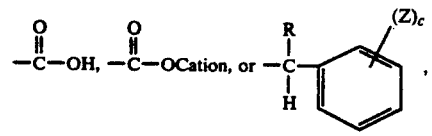

b is 0, 1, 2 or 3 with the proviso that where a is 1, b is 1, R is —H or lower alkyl,
Z is —OH, —O Cation,

R' is —H or lower alkyl and c is 0, 1, 2 or 3 and

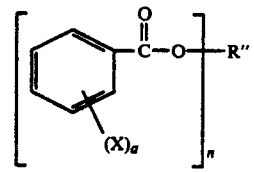

where
X is —OH or —O Cation, a is 1, 2 or 3, n is a whole number of 1 to 6 and

R" is —CH₃; —CH₂CH₃; —CH₂CH₂CH₃; —CH₂CH₂—;

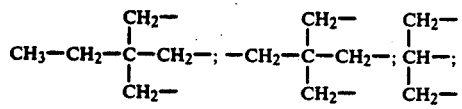

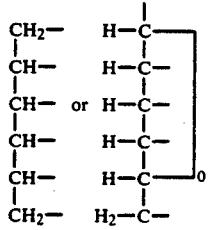

with the proviso that when n does not completely satisfy all of the bonds of R'', the remaining bonds are satisfied with —OH.

2. The additive of claim 1 wherein said component (a) is present in an amount of about 90% by weight to about 30% by weight and said component (b) is present in an amount of about 10% by weight to about 70% by weight.

3. The additive of claim 2 wherein said component (a) is the sodium salt of naphthalene sulfonic acid formaldehyde condensate.

4. The additive of claim 2 wherein said component (b) is pyrogallol.

5. The additive of claim 2 wherein said component (b) is sodium gallate.

6. The additive of claim 2 wherein said component (b) is tannic acid.

7. The additive of claim 2 wherein said component (b) is quebracho.

8. The additive of claim 2 wherein said component (b) is catechol.

9. A cementitious composition containing the additive of claim 1 in an amount sufficient to enhance workability after water is added and to enhance compressive strength of the hardened material.

10. The cementitious composition of claim 9 wherein said additive is present in an amount of from about 0.05% by weight to about 3.0% by weight of the cement component.

11. The material of claim 10 wherein said cementitious composition is concrete.

12. The cementitious composition of claim 9 wherein said additive is composed of (a) from about 90% by weight to about 30% by weight of the sodium salt of naphthalene sulfonic acid formaldehyde condensate and (b) from about 10% by weight to about 70% by weight of at least one hydroxy aromatic compound selected from the following:

$$\begin{array}{c}(X)_a \\ \bigcirc \\ (Y)_b\end{array}$$

where
X is —OH or —O Cation, a is 1, 2 or 3,
Y is $$-\overset{O}{\underset{\|}{C}}-OH, \; -\overset{O}{\underset{\|}{C}}-OCation, \; \text{or} \; -\underset{H}{\overset{R}{\underset{|}{C}}}-\bigcirc(Z)_c$$

b is 0, 1, 2 or 3 with the proviso that where a is 1, b is 1, R is —H or lower alkyl,
Z is —OH, —O Cation, $$-\overset{O}{\underset{\|}{C}}-OH, \; -\overset{O}{\underset{\|}{C}}-OCation, \; \text{or} \; -\overset{O}{\underset{\|}{C}}-OR',$$

R' is —H or lower alkyl and c is 0, 1, 2, or 3 and $$\left[\begin{array}{c}\bigcirc\overset{O}{\underset{\|}{C}}-O \\ (X)_a\end{array}\right]_n R''$$

where
X is —OH or —O Cation, a is 1, 2 or 3, n is a whole number of 1 to 6 and

R'' is —CH₃; —CH₂CH₃; —CH₂CH₂CH₃; —CH₂CH₂—;

$$CH_3-CH_2-\underset{CH_2-}{\overset{CH_2-}{\underset{|}{C}}}-CH_2-; \; -CH_2-\underset{CH_2-}{\overset{CH_2-}{\underset{|}{C}}}-CH_2-; \; \underset{CH_2-}{\overset{CH_2-}{\underset{|}{CH}}}-;$$

$$\begin{array}{c}CH_2-\\CH-\\CH-\\CH-\\CH-\\CH_2-\end{array} \; \text{or} \; \begin{array}{c}H-C-\\H-C-\\H-C-\\H-C-\\H-C-\\H_2-C-\end{array}\Bigg]_o$$

with the proviso that when n does not completely satisfy all of the bonds of R'', the remaining bonds are satisfied with —OH.

13. The composition of claim 12 wherein component (b) is pyrogallol.

14. The composition of claim 12 wherein component (b) is sodium gallate.

15. The composition of claim 12 wherein component (b) is tannic acid.

16. The composition of claim 12 wherein component (b) is quebracho.

17. The composition of claim 12 wherein component (b) is catechol.

* * * * *